United States Patent
Chen et al.

(10) Patent No.: US 10,963,163 B2
(45) Date of Patent: Mar. 30, 2021

(54) CATEGORIZING COMPUTING PROCESS OUTPUT DATA STREAMS FOR FLASH STORAGE DEVICES

(71) Applicant: Red Hat, Inc., Raleigh, NC (US)

(72) Inventors: Huamin Chen, Westborough, MA (US); Jay Vyas, Concord, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/597,297

(22) Filed: Oct. 9, 2019

(65) Prior Publication Data
US 2020/0042176 A1    Feb. 6, 2020

Related U.S. Application Data

(62) Division of application No. 15/405,822, filed on Jan. 13, 2017, now Pat. No. 10,452,275.

(51) Int. Cl.
*G06F 3/06* (2006.01)

(52) U.S. Cl.
CPC ............ *G06F 3/061* (2013.01); *G06F 3/0659* (2013.01); *G06F 3/0683* (2013.01)

(58) Field of Classification Search
CPC ....... G06F 3/061; G06F 3/0659; G06F 3/0683
See application file for complete search history.

(56) References Cited

U.S. PATENT DOCUMENTS

| | | | |
|---|---|---|---|
| 7,676,813 B2 | 3/2010 | Bisset et al. | |
| 8,819,210 B2 | 8/2014 | Tammam | |
| 10,296,264 B2* | 5/2019 | Hassani | ................ G06F 3/0616 |
| 2016/0283125 A1 | 9/2016 | Hashimoto et al. | |
| 2016/0313943 A1 | 10/2016 | Hashimoto et al. | |
| 2017/0075614 A1 | 3/2017 | Kanno | |
| 2017/0228157 A1 | 8/2017 | Yang et al. | |

OTHER PUBLICATIONS

Author Unknown, "Accelerating SQL Server 2012: Using the Nytro XD Application Acceleration Storage Solution," LSI, White Paper, 2013, 5 pages.
Author Unknown, "Multi-stream technology," Samsung Electronics Co., Ltd., Aug. 2016, 2 pages.
Author Unknown, "Optimizing Persistent Disk and Local SSD Performance," Google Cloud Platform, Compute Engine Documentation, available at least as early as Dec. 16, 2016, 32 pages, https://cloud.google.com/compute/docs/disks/performance.
(Continued)

*Primary Examiner* — Aracelis Ruiz
(74) *Attorney, Agent, or Firm* — Withrow & Terranova, PLLC

(57) ABSTRACT

Categorizing computing process output data streams for flash storage devices is disclosed. A first computing process characteristic of a first computing process that generates a first output data stream is determined. A structure that correlates the first computing process characteristic to a first stream identifier is accessed. A first filter driver is associated with the first computing process to configure the first filter driver to receive the first output data stream. The first filter driver is associated with a flash storage device. The first stream identifier is sent to the first filter driver.

12 Claims, 11 Drawing Sheets

(56) References Cited

OTHER PUBLICATIONS

Choi, Changho, "Multi-Stream Write SSD Increasing SSD Performance and Lifetime with Multi-Stream Write Technology," Flash Memory Summit, Aug. 2016, 17 pages.
Kang, Jeong-Uk et al., "The Multi-streamed Solid-State Drive," Proceedings of the 6th USENIX Conference on Hot Topics in Storage and File Systems, Jun. 2014, USENIX Association, 5 pages.
Kranz, Garry, "Coho Data QoS lets multi-tenant storage neighbors peacefully coexist," TechTarget, Aug. 17, 2016, 2 pages, http://searchstorage.techtarget.com/news/450302690/Coho-Data-QoS-lets-multi-tenant-storage-neighbors-peacefully-coexist.
Hruska, Joel, "Researchers: SSDs struggle in virtual machines thanks to garbage collection," ExtremeTech, May 27, 2015, 7 pages.
MSV, Janakiram, "Managing Persistence for Docker Containers," The New Stack, Sep. 23, 2016, 13 pages.
Mylavarapu, Sai Krishna et al., "FSAF: File System Aware Flash Translation Layer for NAND Flash Memories," Proceedings of the EDAA, Apr. 2009, IEEE, 6 pages.
Ouyang, Xiangyong et al., "Enhancing Checkpoint Performance with Staging IO and SSD," Proceedings of the 2010 International Workshop on Storage Network Architecture and Parallel I/Os, May 2010, IEEE Computer Society, 8 pages.
Vaes, Karim, "Docker : Storage Patterns for Persistence," Random thoughts on various topics by a Quirky Cloud Solution Architect, Blog post, Nov. 2, 2016, 11 pages, 11 pages.
Non-Final Office Action for U.S. Appl. No. 15/405,822, dated Nov. 29, 2018, 11 pages.
Notice of Allowance for U.S. Appl. No. 15/405,822, dated Jun. 17, 2019, 9 pages.

\* cited by examiner

CATEGORIZING COMPUTING PROCESS OUTPUT DATA STREAMS FOR FLASH STORAGE DEVICES

RELATED APPLICATION

This application is a divisional of co-pending U.S. patent application Ser. No. 15/405,822, filed on Jan. 13, 2017, entitled "CATEGORIZING COMPUTING PROCESS OUTPUT DATA STREAMS FOR FLASH STORAGE DEVICES," which is hereby incorporated herein by reference in its entirety.

TECHNICAL FIELD

The examples relate generally to the use of flash storage devices in a computing environment and, in particular, to categorizing computing process output data streams for flash storage devices.

BACKGROUND

Computing processes often use flash storage devices, such as solid state disk (SSD) drives, to store persistent data.

SUMMARY

The examples categorize output data streams from different computing processes, such as, by way of non-limiting example, container processes in a cloud computing environment, so that output data streams in the same categories are grouped together in the same blocks by a flash storage device. Block operations performed by the flash storage device, such as garbage collection operations, which may negatively impact the performance of a container process, thus have substantially the same impact on the container processes whose output data streams are categorized into the same category. The examples implement such categorization without a need to modify the container processes.

In one example a method for associating a stream identifier (ID) with an output data stream from a computing process is provided. The method includes determining, by a computing device comprising a processor device, a first computing process characteristic of a first computing process that generates a first output data stream. The method further includes accessing a structure that correlates the first computing process characteristic to a first stream ID. The method further includes associating a first filter driver with the first computing process to configure the first filter driver to receive the first output data stream, the first filter driver being associated with a flash storage device. The method further includes sending the first stream ID to the first filter driver.

In another example a computing device for associating a stream ID with an output data stream is disclosed. The computing device includes a communication interface to communicate with a network, and a processor device coupled to the communication interface. The processor device is to access first information that correlates a first container process to a first stream ID. The processor device is further to associate a first filter driver with the first container process to configure the first filter driver to receive a first output data stream from the first container process, the first filter driver being associated with a flash storage device. The processor device is further to send the first stream ID to the first filter driver.

In another example a computer program product stored on a non-transitory computer-readable storage medium is provided. The computer program product includes instructions to cause a processor device to determine, for each of a plurality of different computing processes associated with corresponding ones of a plurality of different tenants and executing on a same computing device, a corresponding stream identifier, each stream identifier being associated with a particular tenant. The instructions are further to cause the processor device to associate a filter driver with each different computing process. The instructions are further to cause the processor device to associate each filter driver with a same flash storage device, each filter driver being configured to receive an output data stream from the computing process with which the respective filter driver is associated, and send the output data stream and the corresponding stream identifier to the same flash storage device.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
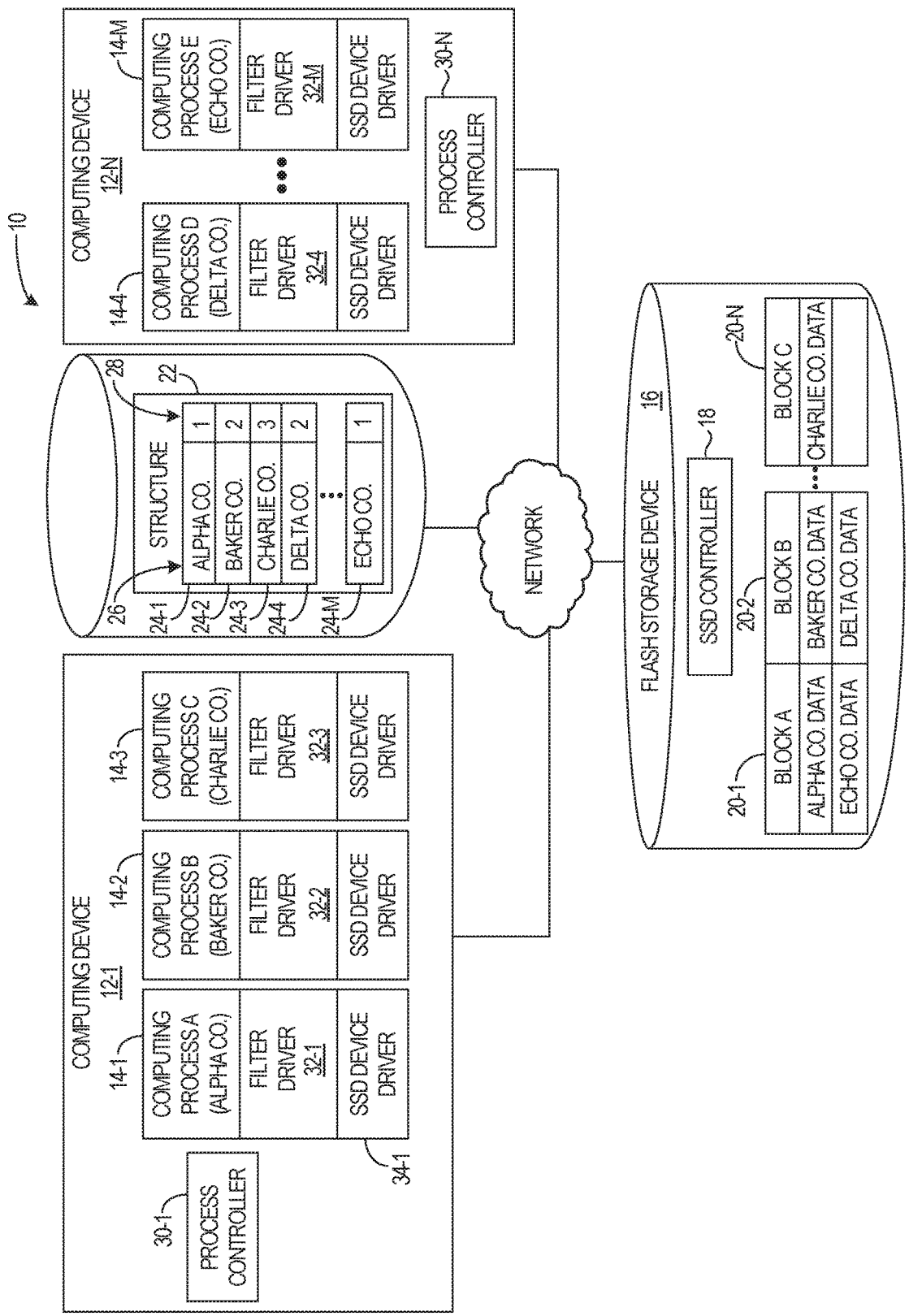
FIG. 1 is a block diagram of an environment in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first filter driver" and "second filter driver," and does not imply a priority, a type, an importance, or other attribute, unless otherwise stated herein. As used herein and in the claims, the articles "a" and "an" in reference to an element refers to "one or more" of the element unless otherwise explicitly specified.

Flash storage devices, such as solid state disk (SSD) drives, are increasingly used in computing environments due to speed advantages over traditional hard drive technologies. Computing processes, such as container processes, are increasingly used in cloud computing environments. Container processes, such as, by way of non-limiting example, Docker container processes, often share flash storage devices to store persistent data. Flash storage devices utilize data blocks to store data, and generally nothing prevents output data, from different container processes, from being stored in the same block.

Flash memory utilized in flash storage devices has certain electronic characteristics that result in block operations that may impact any container process that has data in that block. For example, flash memory has an "Erase-before-Rewrite" property that requires an entire block of cells to be erased before the cells can be reprogrammed with new data. The erase operation is a relatively time-consuming process. Ultimately, some of these electronic characteristics result in relatively frequent garbage collection operations used to regenerate free space. Moreover, flash memory can only be reprogrammed a finite number of times. Thus, a flash storage device frequently implements algorithms to cause block utilization to be relatively uniform across all the blocks. These algorithms may involve relatively frequent data shuffling between highly erased and least erased blocks.

When a flash storage device performs a block operation, the data in the block may be temporarily unavailable during the block operation. Any container process that has data in that block may be temporarily impacted due to the unavailability of the data during the block operation. This unavailability may impact the quality of service (QOS) provided by a container process. Thus, block operations that occur due to activity of one container process may negatively impact another container process that stores data in the same block. Thus, some container processes that have low or no QOS requirements may negatively impact container processes that have high QOS requirements and, thus, may inhibit such container processes from providing the high QOS requirements.

Some flash storage technologies are capable of receiving data that is to be stored in the flash storage device along with a stream identifier (ID). The flash storage device stores data having the same stream ID in the same blocks. Such flash storage technologies can also treat blocks associated with certain stream IDs differently from blocks with other stream IDs, such that blocks with certain stream IDs may have fewer block operations performed than blocks associated with other stream IDs.

The examples implement categorization of output data streams from computing processes. The output data streams in the same categories are associated with the same stream IDs so that output data streams in the same category are stored in the same block in the flash storage device. Among other advantages, this enables data written by computing processes that are associated with one QOS to be blocked together and treated substantially similarly. This also prevents data written by computing processes that are associated with different QOSs from being written to the same block which might otherwise result in a computing process associated with a lower QOS negatively impacting a computing process associated with a higher QOS. Moreover, the examples implement categorization of output data streams without a need to modify the source code of the computing processes, thereby eliminating the need to test and/or implement new versions of the computing processes.

In this regard, FIG. 1 is a block diagram of an environment 10 in which examples may be practiced. The environment 10 is a computing environment that includes a plurality of computing devices 12-1, 12-N (generally, computing devices 12) on which computing processes 14-1-14-M (generally, computing processes 14) may be executed. While for purposes of illustration only two computing devices 12 (sometimes referred to as hosts, or nodes) are illustrated, in practice the environment 10 may include tens, hundreds, or thousands of computing devices 12. Similarly, while for purposes of illustration only five computing processes 14 are illustrated, in practice the environment 10 may have tens, hundreds, or thousands of computing processes 14 concurrently executing. The computing processes 14 may comprise, for example, computer applications that provide services upon request.

The environment 10 also includes one or more flash storage devices 16. In one example, the flash storage device 16 is a solid state drive (SSD). The flash storage device 16 comprises a SSD controller 18 that includes a flash translation layer (FTL) that implements the storage of output data streams received from the computing processes 14 into blocks 20-1-20-N (generally, blocks 20) in the flash storage device 16. The phrase "output data stream" as used herein refers to data written by a respective computing process 14 to a storage device, such as the flash storage device 16. The output data stream comprises data over a life of the respective computing process 14, which may be made up of one or more write operations during the life of the respective computing process 14. As will be discussed in greater detail herein, the flash storage device 16 can operate to segregate output data streams received from the computing processes 14 into blocks 20 based on stream IDs that accompany output data streams received from the computing processes 14. The flash storage device 16 may comprise, for example, any suitable SSD capable of segregating data based on stream IDs, such as SSDs available from Samsung Electronics Co., Ltd.

The computing processes 14 each have one or more computing process characteristics by which the computing processes 14, and/or output data streams generated by such computing processes 14, may be categorized. Categorization may be based on any desired one or more such computing process characteristics. For example, one computing process characteristic may be the particular customer, sometimes referred to as a tenant, with which the respective computing process 14 is associated. Another computing process characteristic may be a namespace with which the respective computing process 14 is associated. Thus, the respective computing processes 14 may be categorized based on one or both of such computing process characteristics. It will be appreciated that customer and namespace are merely two examples of computing process characteristics by which the output data streams of the computing processes 14 may be categorized, and the examples herein are not limited to such computing process characteristics.

For purposes of illustration, assume that each customer of the environment 10 pays for a particular level of QOS. Each level of QOS is categorized by a stream ID. In this example, assume that a lower stream ID indicates a higher level of QOS. Thus, a stream ID of "1" indicates a higher level of QOS than a stream ID of "2." As part of registering a new customer, this information is stored in a structure 22. The structure 22 contains a plurality of entries 24-1-24-M (generally, entries 24), each entry 24 including a customer identifier 26 and a stream ID 28.

Process controllers 30-1, 30-N (generally, process controllers 30) implement, remove, and otherwise manage the computing processes 14 that execute on the computing devices 12. The process controllers 30 may, for example, comprise a portion of an operating system (not illustrated) that is responsible for initiation of new computing processes 14 on the respective computing devices 12. As part of the process of initiating the computing process 14-1, the process controller 30-1 determines that the customer identifier ALPHA CO. is associated with the computing process 14-1. The process controller 30-1 accesses the structure 22 and locates the entry 24-1 associated with ALPHA CO. The process controller 30-1 determines that the stream ID 28 associated with the entry 24-1 is "1."

The process controller 30-1 initiates a filter driver 32-1. The filter driver 32-1 is associated with the flash storage device 16. The process controller 30-1 sends the stream ID "1" to the filter driver 32-1. The filter driver 32-1 is configured to receive an output data stream from the computing process 14-1 and send the output data stream to the flash storage device 16. An SSD device driver 34-1 that is associated with the flash storage device 16 may facilitate communication with the flash storage device 16. The filter driver 32-1 is also configured to send the stream ID "1" with the output data stream received from the computing process 14-1 to the flash storage device 16.

Similarly, the process controller 30-1 initiates filter drivers 32-2 and 32-3 in conjunction with initiating computing processes 14-2 and 14-3. Based on the entry 24-2, the process controller 30-1 sends the stream ID "2" to the filter driver 32-2, and based on the entry 24-3, the process controller 30-1 sends the stream ID "3" to the filter driver 32-3. The process controller 30-N initiates filter drivers 32-4 and 32-M in conjunction with initiating computing processes 14-4 and 14-M. Based on the entry 24-4, the process controller 30-N sends the stream ID "2" to the filter driver 32-4, and based on the entry 24-M, the process controller 30-N sends the stream ID "1" to the filter driver 32-M.

Each of the filter drivers 32 is configured to receive an output data stream from the respective computing process 14 with which the filter driver 32 is associated and is configured to send the output data stream and the stream ID 28 received from the process controllers 30 to the flash storage device 16. The flash storage device 16 receives the output data streams and associated stream IDs 28 from the filter drivers 32 and uses the stream IDs 28 to store output data streams that have the same stream ID 28 in the same blocks 20. Thus, for example, the block 20-1 includes data from the computing processes 14-1 and 14-M, each of which has a stream ID of "1." The block 20-2 includes data from the computing processes 14-2 and 14-4, each of which has a stream ID of "2." The block 20-N includes data from the computing process 14-3, which has a stream ID of "3." Moreover, the flash storage device 16 may be configured to implement functionality differently based on the stream ID 28 associated with a block 20, such as, for example, doing fewer block operations that result in unavailability of data for blocks 20 that are associated with the stream ID "1" than those associated with stream IDs "2" or "3," and doing fewer block operations that result in unavailability of data for blocks 20 that are associated with the stream ID "2" than those associated with the stream ID "3."

Figure 2:
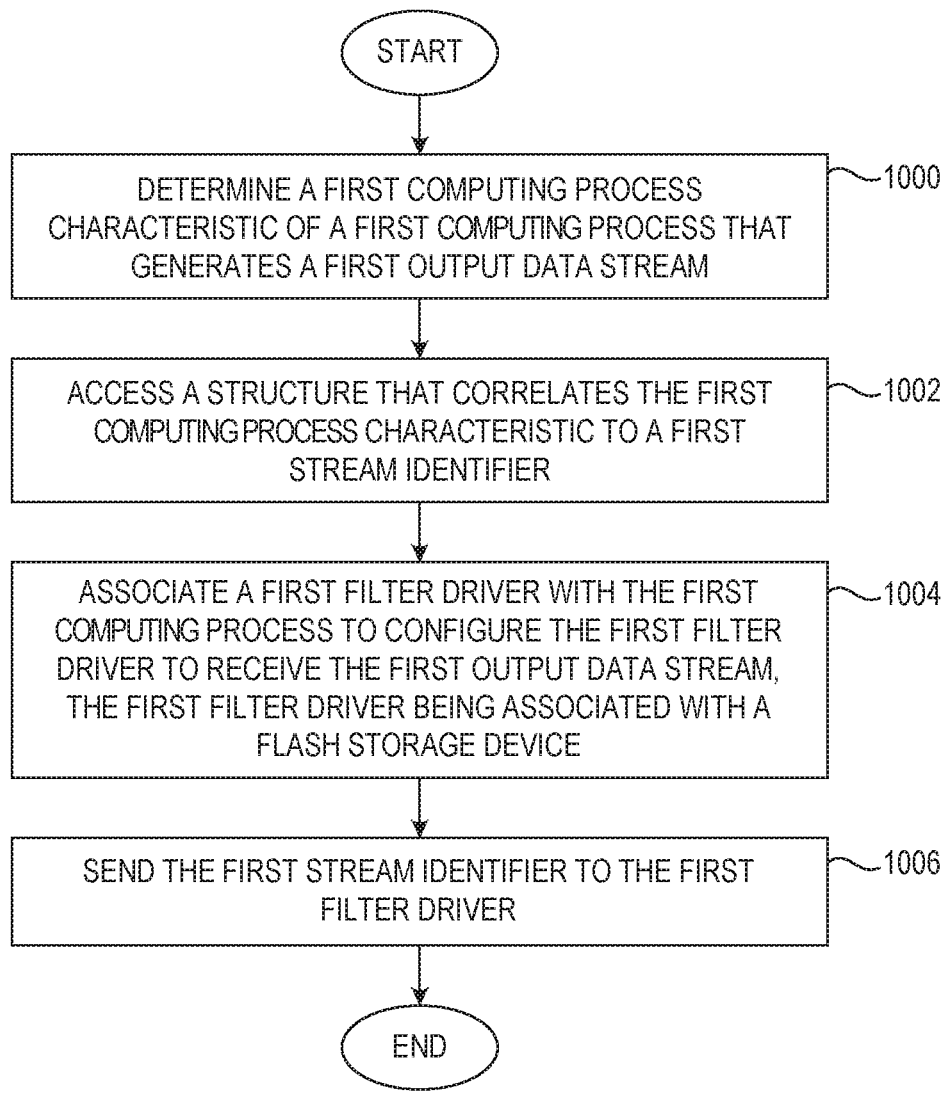
FIG. 2 is a flowchart of a method for associating a stream identifier (ID) with an output data stream from a computing process according to one example.

FIG. 2 is a flowchart of a method for associating a stream identifier with an output data stream from a computing process according to one example. FIG. 2 will be discussed in conjunction with FIG. 1. Assume that the process controller 30-1 is initiating the computing process 14-1, which generates an output data stream. The process controller 30-1 determines a first computing process characteristic of the computing process 14-1 (FIG. 2, block 1000). As discussed above, the computing process characteristic may comprise any characteristic suitable for categorization, including, by way of non-limiting example, a customer associated with the computing process 14-1, a namespace of which the computing process 14-1 is part of, and the like. In this example, the computing process characteristic comprises a company with which the computing process 14-1 is associated, and the process controller 30-1 determines that the computing process 14-1 is associated with ALPHA CO. This may be determined, for example, based on a directory location where the executable code that implements the computing process 14-1 is stored, based on information provided in the request to initiate the computing process 14-1, or, for example, based on a user identifier associated with the computing process 14-1.

The process controller 30-1 accesses the structure 22 that correlates ALPHA CO. with a stream ID 28 (FIG. 2, block 1002). The process controller 30-1, based on the entry 24-1, determines that ALPHA CO. is correlated to the stream ID "1." The process controller 30-1 creates the filter driver 32-1 and associates the filter driver 32-1 with the computing process 14-1 to configure the filter driver 32-1 to receive the first output data stream of the process controller 30-1. The process controller 30-1 also associates the filter driver 32-1 with the flash storage device 16 (FIG. 2, block 1004). In one example, such as in a Linux environment, the filter driver 32-1 may be initiated and associated with the flash storage device 16 through a command such as "create—name=/dev/filter0 slave=/dev/ssd0" wherein the filter driver 32-1 is named "/dev/filter0" and is associated with the flash storage device 16 via the term "slave=/dev/ssd0", where the flash storage device 16 is named "/dev/ssd0". After the filter driver 32-1 is initiated, a filesystem may be created on top of the filter driver 32-1 using, for example, a mkfs command such as "mkfs/dev/filter0", wherein the filter driver 32-1 is named "/dev/filter0". The filesystem may then be mounted on the computing device 12-1 at a particular mountpoint, such as "/mnt" via the command "mount/dev/filter0/mnt". In some examples, this processing may occur prior to initiating the computing process 14-1.

The process controller 30-1 sends the stream identifier "1" to the filter driver 32-1 (FIG. 2, block 1006). This may be done in any suitable manner such as, by way of non-limiting example, via the use of an ioctl function as illustrated below:

ioctl(device_id, SET_STREAM_ID, id_pointer), where device_id is the internal representation of the filter driver 32-1, SET_STREAM_ID is a command that tells the filter driver 32-1 to set the stream ID, and id_pointer is a memory pointer that points to a memory address that contains the stream ID.

The filter driver 32-1 receives the stream ID "1." Thereafter, the filter driver 32-1 receives output data written by the computing process 14-1. The filter driver 32-1 sends the stream ID "1" and the output data to the flash storage device 16 for storage of the output data. As discussed previously, the flash storage device 16 uses the stream ID 28 to store the output data in blocks that contain output data from other computing processes 14 that have the same stream ID 28.

Figure 3:
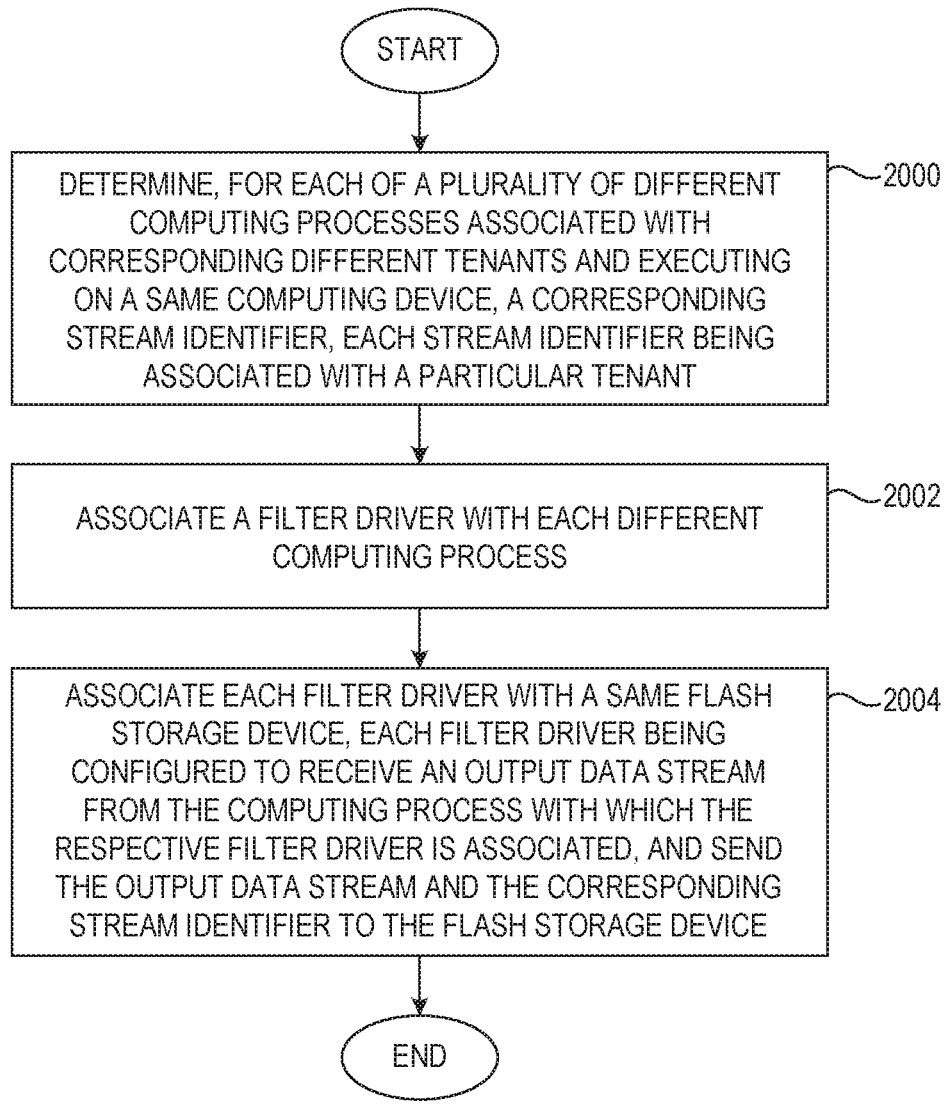
FIG. 3 is a flowchart of a method for associating stream IDs with output data streams from a plurality of computing processes according to one example.

While for purposes of illustration the process has been described with respect to a single computing process 14-1, in practice the process controller 30-1 repeats this process for any number of different computing processes 14. In this regard, FIG. 3 is a flowchart of a method for associating stream IDs with output data streams from a plurality of computing processes according to one example. FIG. 3 will be discussed in conjunction with FIG. 1. The process controller 30-1 determines, for each of the plurality of different computing processes 14-1, 14-2, 14-3 associated with corresponding different tenants and executing on the computing device 12-1, a corresponding stream ID 28 (FIG. 3, 2000). Each stream ID 28 is associated with a particular tenant. The process controller 30-1 associates a filter driver 32 with each different computing process 14 (FIG. 3, 2002). The process controller 30-1 associates each filter driver 32 with the same flash storage device 16 (FIG. 3, 2004). Each filter driver 32 is configured to receive an output data stream from the computing process 14 with which the respective filter driver 32 is associated, and send the output data stream and the corresponding stream ID 28 to the flash storage device 16.

Figure 4:
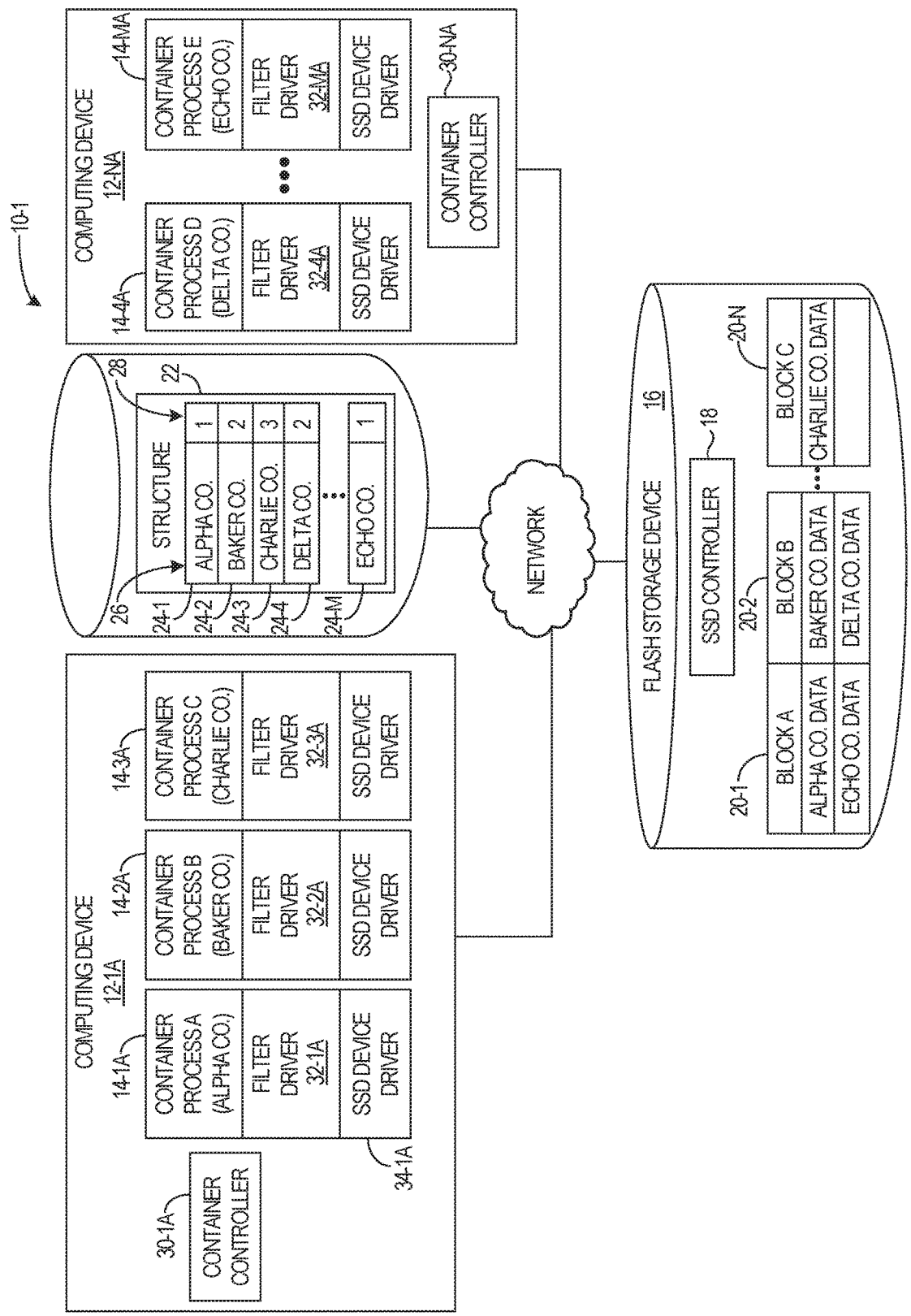
FIG. 4 is a block diagram of another environment in which examples may be practiced.

FIG. 4 is a block diagram of an environment 10-1 in which additional examples may be practiced. In this example, the environment 10-1 is a cloud computing environment that includes a plurality of computing devices 12-1A, 12-NA (generally, computing devices 12A). This example utilizes computing processes that comprise container processes 14-1A-14-MA (generally, container processes 14A). While for purposes of illustration only two computing devices 12A (sometimes referred to as hosts, or nodes) are illustrated, in practice the environment 10-1 may include tens, hundreds, or thousands of computing devices 12A. Similarly, while for purposes of illustration only five container processes 14A are illustrated, in practice the environment 10-1 may have tens, hundreds, or thousands of container processes 14A concurrently executing. The container processes 14A may comprise containers associated with any containerization technology, such as, by way of non-limiting example, Docker container technology, Kubernetes container technology, CoreOs (Rocket) container technology, Tectonic container technology, and the like.

The environment 10-1 also includes one or more flash storage devices 16. In one example, the flash storage device 16 is a solid state drive (SSD) that includes an SSD controller 18 that includes a flash translation layer (FTL) that implements the storage of output data streams received from the container processes 14A into blocks 20-1-20-N (generally, blocks 20) in the flash storage device 16. The phrase "output data stream" as used herein refers to data written by a respective container process 14A to a storage device, such as the flash storage device 16. The output data stream comprises data over a life of the container process 14A, which may be made up of one or more write operations during the life of the container process 14A. As will be discussed in greater detail herein, the flash storage device 16 can operate to segregate output data streams received from the container processes 14A into blocks 20 based on stream IDs that accompany output data streams received from the container processes 14A.

The flash storage devices 16 may, in some examples, be from any number of SSD vendors, including, by way of non-limiting example, Samsung®, Dell® EMC®, and the like. The flash storage devices 16 may also be used in conjunction with a block storage technology, such as, by way of non-limiting example, OpenStack block storage, Dell® EMC® block storage, NetApp® block storage, PureStorage, Gluster, Oracle® ZFS storage, and the like.

The container processes 14A each have one or more container characteristics by which the container processes 14A, and/or output data streams generated by such container processes 14A, may be categorized. Categorization may be based on any desired one or more such container characteristics. For example, one container characteristic may be the particular customer, sometimes referred to as a tenant, with which the container process 14A is associated. This may be determined, for example, based on a name of the container process, a directory where the executable image of the container process is located, a user identifier associated with the container process, or the like. Another container characteristic may be a namespace with which the container process 14A is associated. Thus, the container processes 14A may be categorized based on one or both of such container characteristics. It will be appreciated that customer and namespace are merely two examples of container characteristics by which the output data streams of the container processes 14A may be categorized, and the examples herein are not limited to such container characteristics.

For purposes of illustration, assume that each customer of the environment 10-1 pays for a particular level of QOS. Each level of QOS is categorized by a stream ID. In this example, assume that a lower stream ID indicates a higher level of QOS. Thus, a stream ID of "1" indicates a higher level of QOS than a stream ID of "2." As part of registering a new customer, this information is stored in a structure 22. The structure 22 contains a plurality of entries 24-1-24-M (generally, entries 24), each entry 24 including a customer identifier 26 and a stream ID 28.

Container controllers 30-1A, 30-NA (generally, container controllers 30A) implement, remove, and otherwise manage the container processes 14A that execute on the computing devices 12A. As part of the process of initiating the container process 14-1A, the container controller 30-1A determines that the customer identifier ALPHA CO. is associated with the container process 14-1A. The container controller 30-1A accesses the structure 22 and locates the entry 24-1 associated with ALPHA CO. The entry 24-1 comprises information that correlates the container process 14-1A to a stream ID 28. In particular, the entry 24-1 correlates the tenant ALPHA CO. with the stream ID 28. The container controller 30-1A determines that the stream ID 28 associated with the entry 24-1 is "1."

The container controller 30-1A initiates a filter driver 32-1A. The filter driver 32-1A is associated with the flash storage device 16. The creation and association of the filter driver 32-1A with the container process 14-1A may be done in a similar fashion as described above with regard to FIG. 2 in the context of the environment 10. In particular, in one example, such as in a Linux environment, the filter driver 32-1A may be initiated and associated with the flash storage device 16 through a command such as "create—name=/dev/filter0 slave=/dev/ssd0" wherein the filter driver 32-1A is named "/dev/filter0" and is associated with the flash storage device 16 via the term "slave=/dev/ssd0", where the flash storage device 16 is named "/dev/ssd0". After the filter driver 32-1A is initiated, a filesystem may be created on top of the filter driver 32-1A using, for example, a mkfs command such as "mkfs/dev/filter0", wherein the filter driver 32-1A is named "/dev/filter0". The filesystem may then be mounted on the computing device 12-1A at a particular mountpoint, such as "/mnt" via the command "mount/dev/filter0/mnt". In some examples, this processing may occur prior to initiating the computing process 14-1A.

The container controller 30-1A sends the stream ID "1" to the filter driver 32-1A. This may be done in any suitable manner such as, by way of non-limiting example, via the use of an ioctl function as illustrated below:

ioctl(device_id, SET_STREAM_ID, id_pointer), where device_id is the internal representation of the filter driver 32-1, SET_STREAM_ID is a command that tells the filter driver 32-1 to set the stream ID, and id_pointer is a memory pointer that points to a memory address that contains the stream ID.

The filter driver 32-1A is configured to receive an output data stream from the container process 14-1A and send the output data stream to the flash storage device 16. An SSD device driver 34-1A that is associated with the flash storage device 16 may facilitate communication with the flash storage device 16. The filter driver 32-1A is also configured to send the stream ID "1" with the output data stream received from the container process 14-1A to the flash storage device 16.

Similarly, the container controller 30-1A initiates filter drivers 32-2A and 32-3A in conjunction with initiating container processes 14-2A and 14-3A. Based on the entry 24-2, the container controller 30-1A sends the stream ID "2" to the filter driver 32-2A, and based on the entry 24-3, the container controller 30-1A sends the stream ID "3" to the filter driver 32-3A. The container controller 30-NA initiates filter drivers 32-4A and 32-MA in conjunction with initiating container processes 14-4A and 14-MA. Based on the entry 24-4, the container controller 30-NA sends the stream ID "2" to the filter driver 32-4A, and based on the entry 24-M, the container controller 30-NA sends the stream ID "1" to the filter driver 32-MA.

Each of the filter drivers 32A is configured to receive an output data stream from the respective container process 14A with which the filter driver 32A is associated and is configured to send the output data stream and the stream ID 28 received from the container controllers 30A to the flash storage device 16. The flash storage device 16 receives the output data streams and associated stream IDs 28 from the filter drivers 32A and uses the stream IDs 28 to store output data streams that have the same stream ID 28 in the same blocks 20. Thus, for example, the block 20-1 includes data from the container processes 14-1A and 14-MA, each of which has a stream ID of "1." The block 20-2 includes data from the container processes 14-2A and 14-4A, each of which has a stream ID of "2." The block 20-N includes data from the container process 14-3A, which has a stream ID of "3." Moreover, the flash storage device 16 may be configured to implement functionality differently based on the stream ID 28 associated with a block 20, such as, for example, doing fewer block operations that result in unavailability of data for blocks 20 that are associated with the stream ID "1" than those associated with stream IDs "2" or "3," and doing fewer block operations that result in unavailability of data for blocks 20 that are associated with the stream ID "2" than those associated with the stream ID "3."

Figure 5:
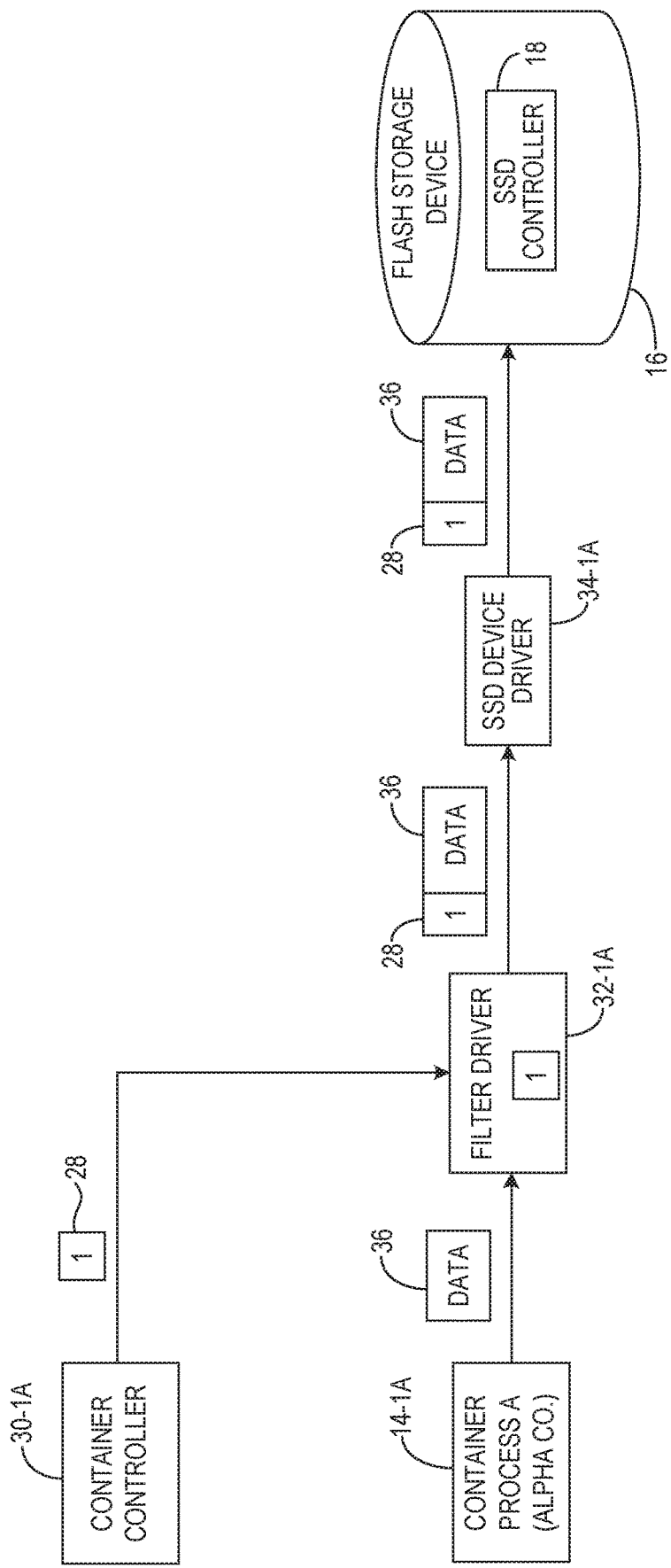
FIG. 5 is a block diagram illustrating operation of a filter driver according to one example.

FIG. 5 is a block diagram illustrating operation of the filter driver 32-1A in a container process environment. FIG. 5 will be discussed in conjunction with FIG. 4. In this example, the container controller 30-1A sends the stream ID 28 to the filter driver 32-1A. The filter driver 32-1A may, for example, store the stream ID 28 in a memory. The filter driver 32-1A receives, from the container process 14-1A, data 36 which composes part of the output data stream generated over time by the container process 14-1A. The filter driver 32-1A adds the stream ID 28 to the data 36. In one example, the filter driver 32-1A may insert the stream ID 28 in a header field of a header that is associated with the data 36. The filter driver 32-1A then writes the data to the flash storage device 16. This may be facilitated by the SSD device driver 34-1A.

Figure 6:
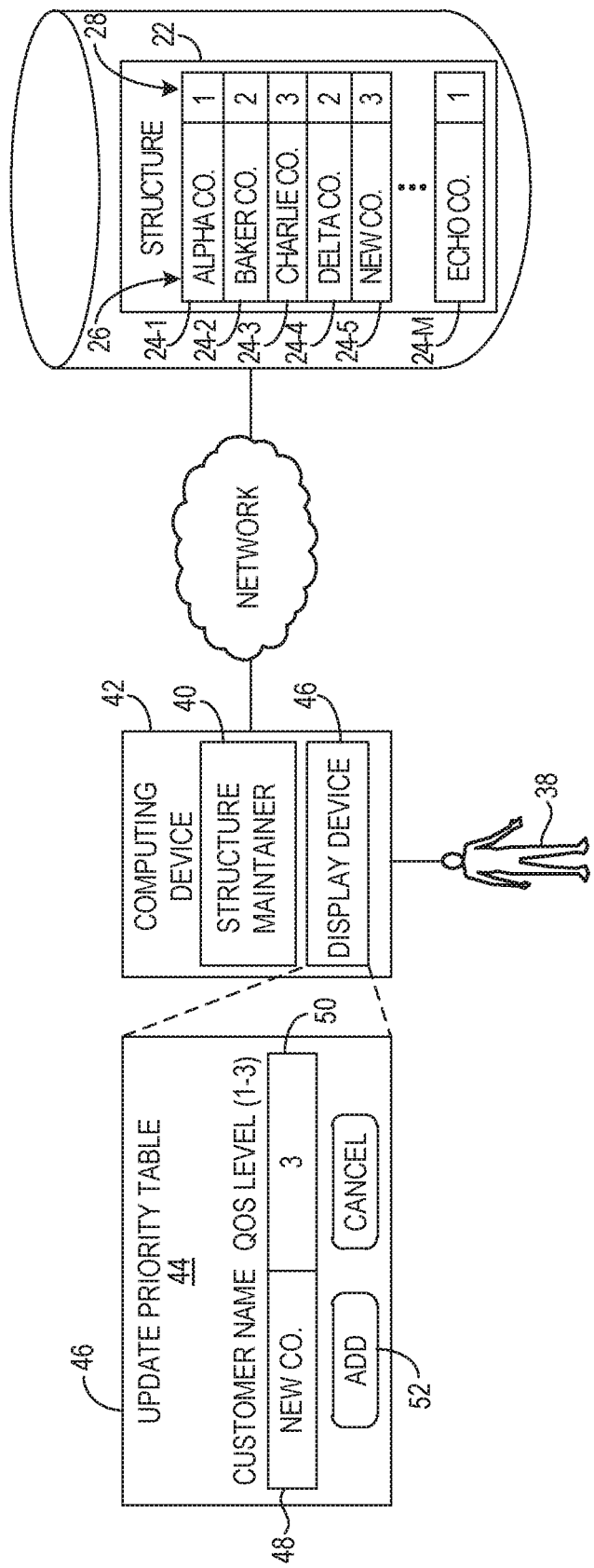
FIG. 6 is a block diagram illustrating maintenance of a structure that correlates a container characteristic to a stream ID according to one example.

FIG. 6 is a block diagram illustrating maintenance of the structure 22 according to one example. A user, such as an operator 38, may interact with a structure maintainer 40 that executes on a computing device 42. The structure maintainer 40 facilitates additions, deletions, and modifications of the structure 22. In this example, assume that the operator 38 desires to add a new company NEW CO. to the structure 22. In response to input of the operator 38, the structure maintainer 40 presents a user interface 44 on a display device 46 of the computing device 42. The user interface 44 allows the operator 38 to enter the name of a company in a field 48, and a level of QOS in a range between 1 and 3 in a field 50. After entry of the appropriate information and selection of the add control 52, the structure maintainer 40 adds a new entry 24-5 to the structure 22 that indicates the company NEW CO. has a stream ID of "3."

Figure 7:
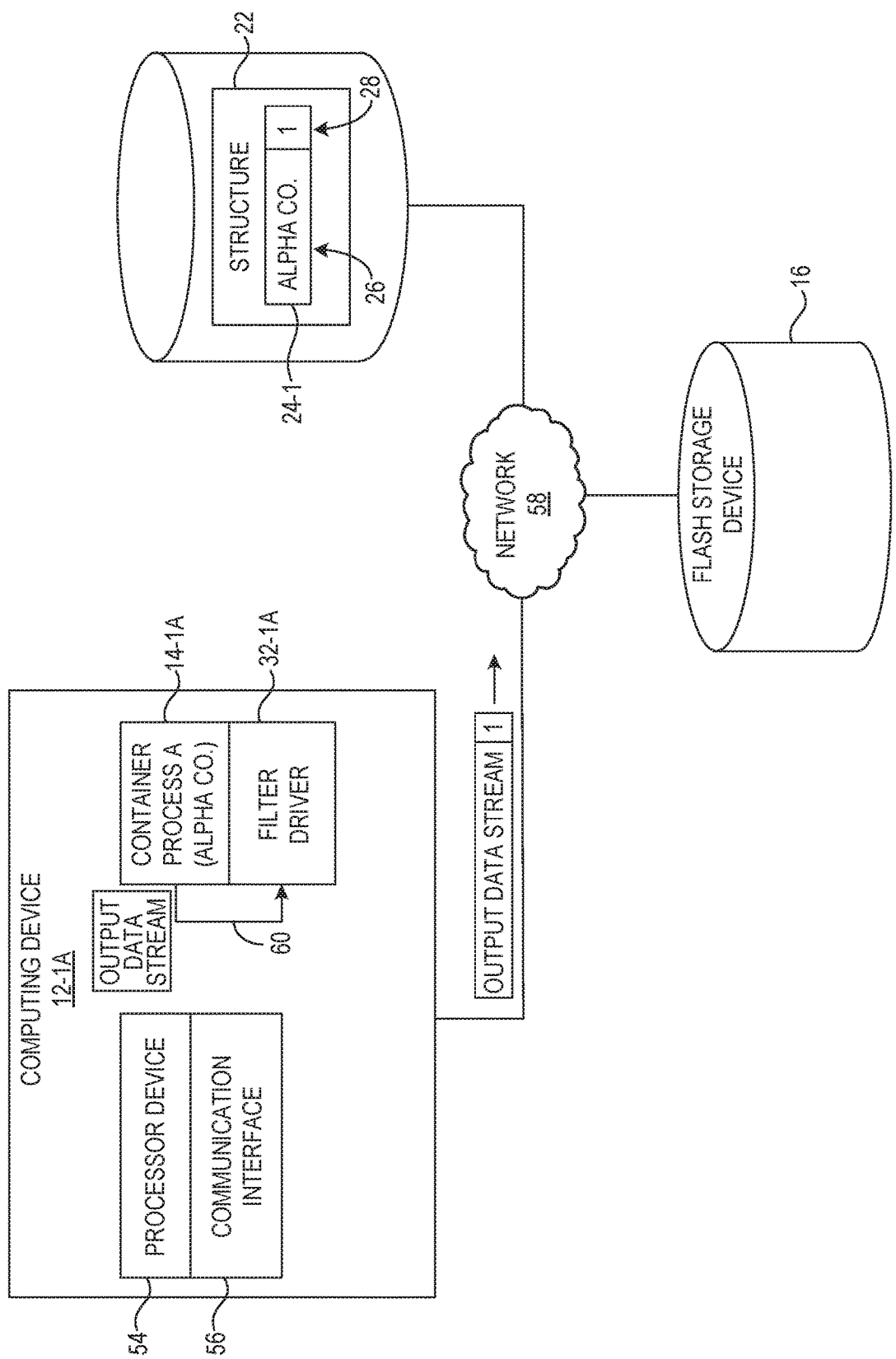
FIG. 7 is a block diagram of a subset of the elements illustrated in FIG. 1 according to one example.

FIG. 7 is a block diagram of a subset of the elements illustrated in FIG. 4 according to one example. In this example, the computing device 12-1A includes a processor device 54 and a communication interface 56. The processor device 54, in some examples, executes complex programming instructions to implement some or all of the functionality discussed herein with respect to the container controller 30-1A and/or the computing device 12-1A. Thus, in examples where the container controller 30-1A comprises software instructions that program the processor device 54 to carry out functionality discussed herein, functionality implemented by the container controller 30-1A may be attributed herein to the processor device 54. Moreover, because the container controller 30-1A is a component of the computing device 12-1A, functionality implemented by the container controller 30-1A may be attributed to the computing device 12-1A generally. The communication interface 56 is configured to communicate with a network 58 to facilitate communication between the computing device 12-1A and other devices, such as the flash storage device 16.

The processor device 54 determines a container characteristic of the container process 14-1A, which generates an output data stream 60. The processor device 54 accesses the structure 22 to obtain information that correlates the container process 14-1A to the stream ID 28. In this example, such information includes the customer identifier 26 associated with the container process 14-1A, which the entry 24-1 correlates to the stream ID 28. The processor device 54 associates the filter driver 32-1A with the container process 14-1A to configure the filter driver 32-1A to receive the output data stream 60. The filter driver 32-1A is associated with the flash storage device 16. The processor device 54 sends the stream ID 28 to the filter driver 32-1A.

Figure 8:
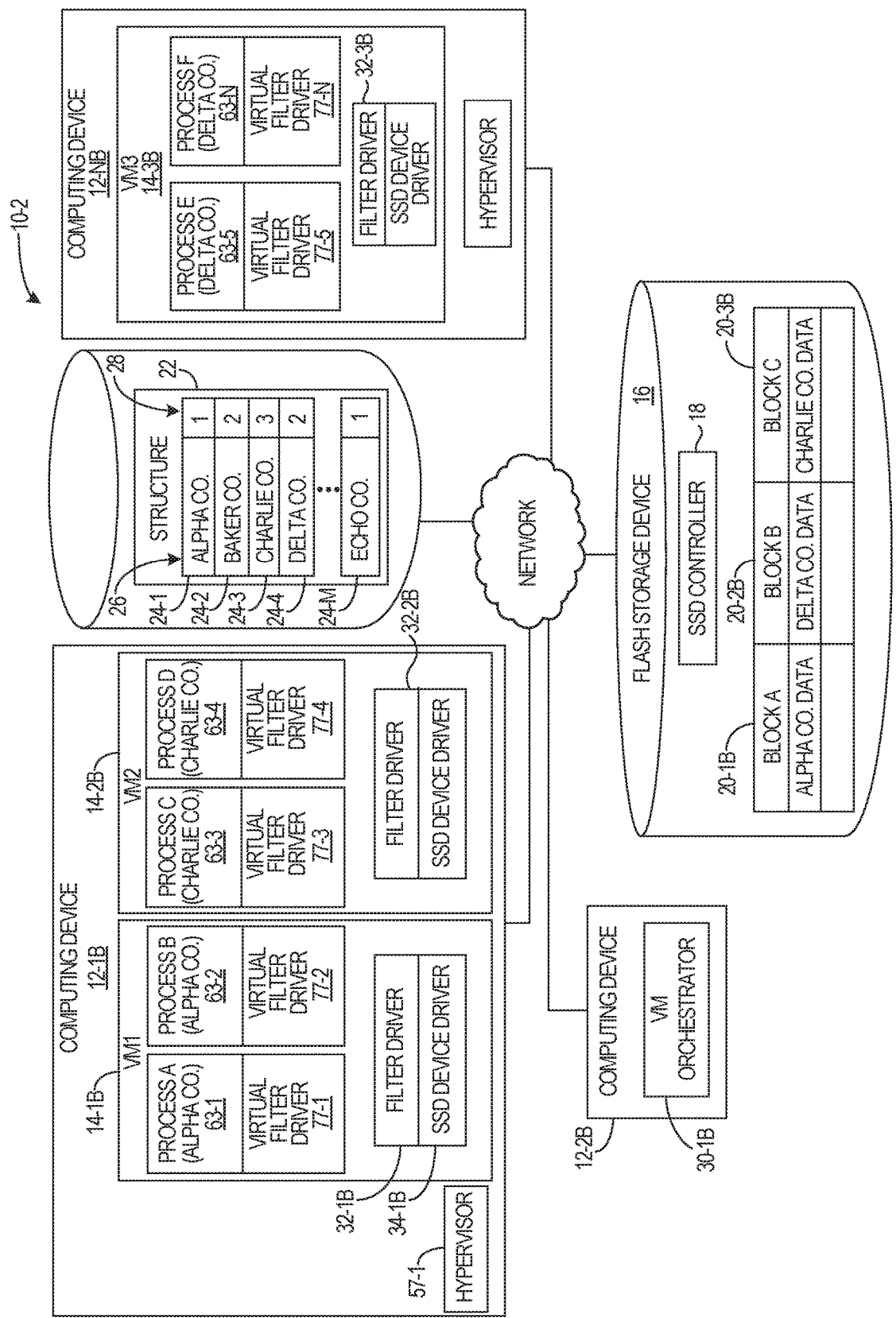
FIG. 8 is a block diagram of another environment in which examples may be practiced.

FIG. 8 is a block diagram of an environment 10-2 in which additional examples may be practiced. In this example, the environment 10-2 is a virtual machine computing environment that includes a plurality of computing devices 12-1B, 12-NB (generally, computing devices 12B). This example utilizes computing processes that comprise virtual machines (VMs) 14-1B, 14-2B and 14-3B (generally, VMs 14B). While for purposes of illustration only three computing devices 12B (sometimes referred to as hosts, or nodes) are illustrated, in practice the environment 10-2 may include tens, hundreds, or thousands of computing devices 12B. Similarly, while for purposes of illustration only three VMs 14B are illustrated, in practice the environment 10-2 may have tens, hundreds, or thousands of VMs 14B concurrently executing. The VMs 14B may comprise virtual machines associated with any virtualization technology, including, by way of non-limiting example Red Hat® Virtualization technology, VMware® Vsphere Virtualization technology, Microsoft® Hyper-V Virtualization technology, Oracle® Virtualization technology, and the like. The VMs 14B include one or more computing processes 63-1-63-N, at least some of which generate output data streams.

The environment 10-2 also includes one or more flash storage devices 16. In one example, the flash storage device 16 is a solid state drive (SSD) that includes an SSD controller 18 that includes a flash translation layer (FTL) that implements the storage of output data streams received from the VMs 14B into blocks 20-1B-20-3B (generally, blocks 20B) in the flash storage device 16. The phrase "output data stream" as used herein refers to data written by a respective computing process 63-1-63-N (generally, computing processes 63) executing in a corresponding VM 14B to a storage device, such as the flash storage device 16. In this example, each VM 14B is associated with a particular tenant. Thus, each computing process 63 that executes in a VM 14B is associated with the same tenant as the VM 14B in which the computing process 63 executes. An output data stream generated by a computing process 63 is also associated with the corresponding VM 14B in which the computing process 63 executes. The output data stream comprises data over a life of the computing process 63, which may be made up of one or more write operations during the life of the respective computing process 63. As will be discussed in greater detail herein, the flash storage device 16 can operate to segregate output data streams received from the VMs 14B into blocks 20B based on stream IDs that accompany output data streams received from the VMs 14B. The flash storage device 16 may comprise, for example, any suitable SSD capable of segregating data based on stream IDs, such as SSDs available from Samsung Electronics Co., Ltd.

The VMs 14B each have one or more VM characteristics by which the VMs 14B, and/or output data streams associated with the VMs 14B, may be categorized. Categorization may be based on any desired one or more such VM characteristics. For example, one VM characteristic may be the particular customer, sometimes referred to as a tenant, with which the VM 14B is associated. This information may be maintained in a table, based on a user ID associated with the VM 14B, or determined in any other desirable manner. Another VM characteristic may be a namespace with which the VM 14B is associated. Thus, the VMs 14B may be categorized based on one or both of such VM characteristics. It will be appreciated that customer and namespace are merely two examples of VM characteristics by which the output data streams associated with the VMs 14B may be categorized, and the examples herein are not limited to such VM characteristics.

For purposes of illustration, assume that each customer of the environment 10-2 pays for a particular level of QOS. Each level of QOS is categorized by a stream ID. In this example, assume that a lower stream ID indicates a higher level of QOS. Thus, a stream ID of "1" indicates a higher level of QOS than a stream ID of "2." As part of registering a new customer, this information is stored in a structure 22. The structure 22 contains a plurality of entries 24-1-24-M (generally, entries 24), each entry 24 including a customer identifier 26 and a stream ID 28.

A VM orchestrator 30-1B implements, removes, and otherwise manages the VMs 14B that execute on the computing devices 12B. As part of the process of initiating the VM 14-1B, the VM orchestrator 30-1B determines that the customer identifier ALPHA CO. is associated with the VM 14-1B. The VM orchestrator 30-1B accesses the structure 22 and locates the entry 24-1 associated with ALPHA CO. The entry 24-1 comprises information that correlates the VM 14-1B to a stream ID 28. In particular, the entry 24-1 correlates the tenant ALPHA CO. with the stream ID 28. The VM orchestrator 30-1B determines that the stream ID 28 associated with the entry 24-1 is "1."

The VM orchestrator 30-1B initiates a filter driver 32-1B and attaches the filter driver 32-1B to the VM 14-1B. The filter driver 32-1B is associated with the flash storage device 16. Similar to the manner discussed above with regard to FIGS. 1 and 4, this may be accomplished, for example by a "create—name=/dev/filter0 slave=/dev/ssd0" wherein the filter driver 32-1B is named "/dev/filter0" and is associated with the flash storage device 16 via the term "slave=/dev/ssd0", where the flash storage device 16 is named "/dev/ssd0".

The VM orchestrator 30-1B sends the stream ID "1" to the filter driver 32-1B. This may be done in any suitable manner such as, by way of non-limiting example, via the use of an ioctl function as illustrated below:

ioctl(device_id, SET_STREAM_ID, id_pointer), where device_id is the internal representation of the filter driver 32-1B, SET_STREAM_ID is a command that tells the filter driver 32-1B to set the stream ID, and id_pointer is a memory pointer that points to a memory address that contains the stream ID.

When the process 63-1 is initiated inside the VM 14-1B, the process 63-1 is associated with a virtual filter driver 77-1 which directs output data streams generated by the process 63-1 to a hypervisor 57-1, which in turn directs the output data streams to the filter driver 32-1B. The filter driver 32-1B is configured to receive the output data stream from the process 63-1 and send the output data stream to the flash storage device 16. An SSD device driver 34-1B that is associated with the flash storage device 16 may facilitate communication with the flash storage device 16. The filter driver 32-1B is also configured to send the stream ID "1" with the output data stream received from the process 63-2 to the flash storage device 16. Similarly, a virtual filter driver 77-2 is associated with the process 63-2. Output data streams from the process 63-2 are directed by the virtual filter driver 77-2 to the hypervisor 57-1, which in turn directs the output data streams to the filter driver 32-1B.

The VM orchestrator 30-1B initiates a VM 14-2B on the computing device 12-1B that is associated with the tenant "CHARLIE CO." The VM orchestrator 30-1B determines that the customer identifier CHARLIE CO. is associated with the VM 14-2B. The VM orchestrator 30-1B accesses the structure 22 and locates the entry 24-3 associated with CHARLIE CO, and determines that the stream ID for CHARLIE CO. is "3." The VM orchestrator 30-1B initiates a filter driver 32-2B and attaches the filter driver 32-2B to the VM 14-2B in a manner discussed above with regard to the VM 14-1B. The VM orchestrator 30-1B sends the stream ID "3" to the filter driver 32-2B. When processes 63-3, 63-4 are initiated they are associated with virtual filter drivers 77-3, 77-4 respectively, which direct output data streams of the processes 63-3, 63-4 to the filter driver 32-2B.

The VM orchestrator 30-1B initiates a VM 14-3B on the computing device 12-NB that is associated with the tenant "DELTA CO." The VM orchestrator 30-1B determines that the tenant DELTA CO. is associated with the VM 14-3B. The VM orchestrator 30-1B accesses the structure 22 and locates the entry 24-4 associated with DELTA CO., and determines that the stream ID for DELTA CO. is "2." The VM orchestrator 30-1B initiates a filter driver 32-3B and attaches the filter driver 32-3B to the VM 14-3B in a manner discussed above with regard to the VM 14-1B. The VM orchestrator 30-1B sends the stream ID "3" to the filter driver 32-3B. When processes 63-5, 63-N are initiated they are associated with virtual filter drivers 77-5, 77-N respectively, which direct output data streams of the processes 63-5, 63-N to the filter driver 32-3B.

The flash storage device 16 receives the output data streams and associated stream IDs 28 from the filter drivers 32B and uses the stream IDs 28 to store output data streams that have the same stream ID 28 in the same blocks 20. Thus, for example, the block 20-1B includes data from the computing processes 63-1, 63-2 each of which has a stream ID of "1." The block 20-2B includes data from the computing processes 63-5, 63-N, each of which has a stream ID of "2." The block 20-3B includes data from the computing processes 63-3, 63-4, each of which has a stream ID of "3." Moreover, the flash storage device 16 may be configured to implement functionality differently based on the stream ID 28 associated with a block 20, such as, for example, doing fewer block operations that result in unavailability of data for blocks 20 that are associated with the stream ID "1" than those associated with stream IDs "2" or "3," and doing fewer block operations that result in unavailability of data for blocks 20 that are associated with the stream ID "2" than those associated with the stream ID "3."

Figure 9:
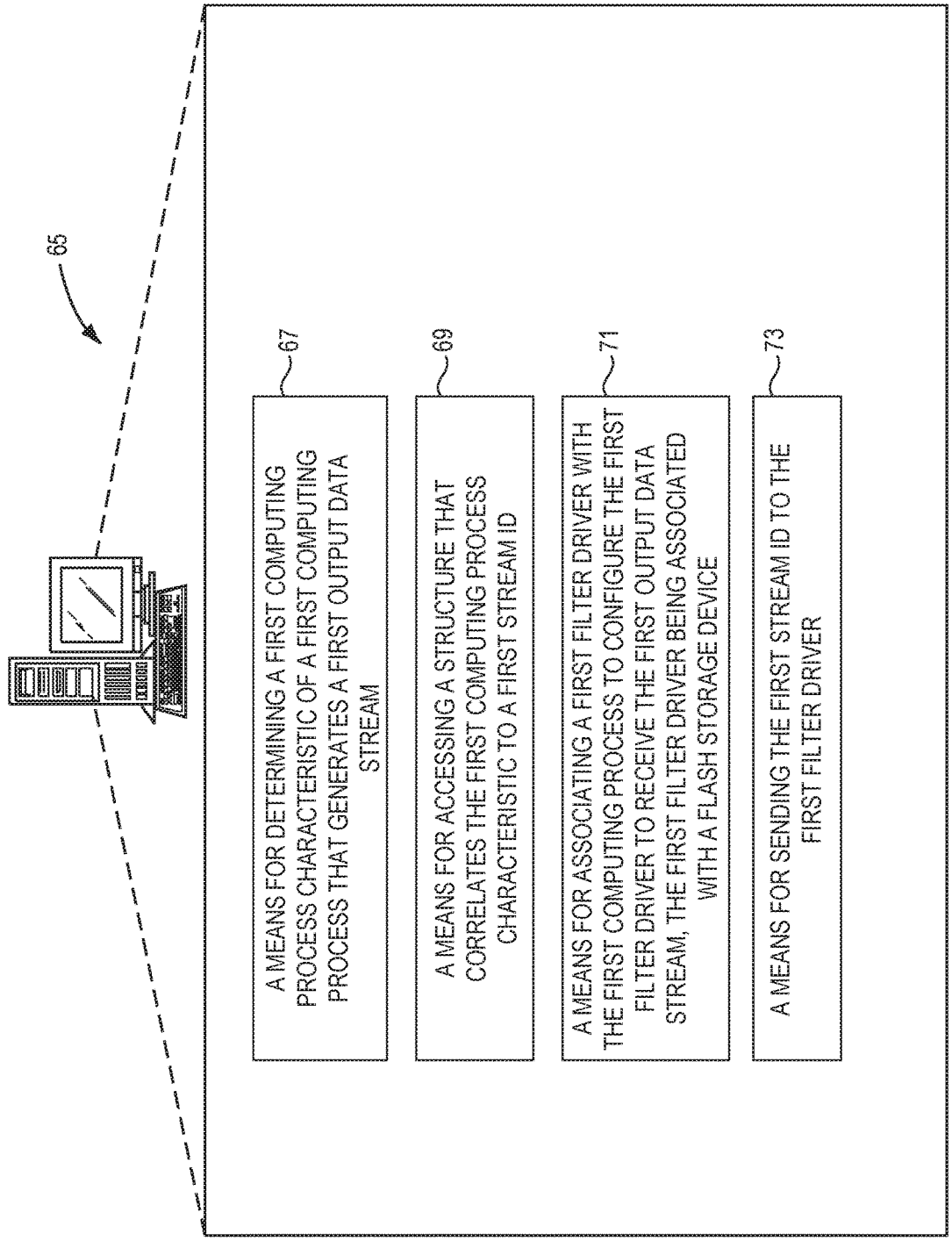
FIG. 9 is a block diagram of a computing device suitable for implementing aspects of the disclosed examples.

FIG. 9 is a block diagram of a computing device 65 suitable for implementing aspects of the disclosed examples. The computing device 65 includes a means 67 for determining a first computing process characteristic of a first computing process that generates a first output data stream. The means 67 may comprise, for example, aspects of the process controller 30-1 (FIG. 1) that determines a computing process characteristic such as a tenant, or namespace, with which a computing process 14 is associated. Such information may be determined, for example, based on a directory in which the executable code associated with the computing process 14 is located, based on configuration information accessible to the process controller 30-1, and/or based on information provided to the process controller 30-1 in conjunction with an instruction to initiate the computing process 14. Similarly, as discussed above with regard to FIG. 4, wherein the computing process comprises a container process, the means 67 may comprise, for example, aspects of the container controller 30-1A that determine a customer or namespace based, for example, on a name of the container process, a directory where the executable image of the container process is located, a user identifier associated with the container process, or the like. In the context of FIG. 8, wherein the computing process comprises a VM, the means 67 may comprise, for example, aspects of the VM orchestrator 30-1B that determine a customer or namespace that is associated with a VM 14B, as discussed above with regard to FIG. 8.

The computing device 65 includes a means 69 for accessing a structure that correlates the first computing process characteristic to a first stream ID. The means 69 may comprise, for example, aspects of the process controller 30-1 (FIG. 1) that accesses the structure 22 and traverses the entries 24 to locate an entry 24 that includes the computing process characteristic determined by the means 67. Such entry 24 correlates the particular computing process characteristic to a particular stream ID 28. Similarly, in the context of FIG. 4, the means 69 may comprise, for example, aspects of the container controller 30-1A that function substantially similarly to the process controller 30-1 as discussed above to correlate a container characteristic to a first stream ID, again by accessing the structure 22 to locate the entry 24 that correlates a container characteristic to a stream ID. Similarly, in the context of FIG. 8, the means 69 may comprise, for example, aspects of the VM orchestrator 30-1B that function substantially similarly to the process controller 30-1 as discussed above to correlate a VM characteristic to a first stream ID, by, for example, accessing the structure 22 to locate the entry 24 that correlates a VM characteristic to a stream ID.

The computing device 65 includes a means 71 for associating a first filter driver with the first computing process to configure the first filter driver to receive the first output data stream, the first filter driver being associated with a flash storage device. The means 71 may comprise, for example, aspects of the process controller 30-1 (FIG. 1) that associates a filter driver 32 to a computing process 14, and that further associates the filter driver 32 to the flash storage device 16 as discussed above with regard to FIGS. 1 and 2. Similarly, in the context of FIG. 4, the means 71 may comprise, for example, aspects of the container controller 30-1A that function substantially similarly to the process controller 30-1 as discussed above with regard to FIG. 4 to associate a filter driver 32A to a container process 14A, and that further associates the filter driver 32A to the flash storage device 16. Similarly, in the context of FIG. 8, the means 71 may comprise, for example, aspects of the VM orchestrator 30-1B that function substantially similarly to the process controller 30-1 as discussed above with regard to FIG. 8 to associate a filter driver 32B to a VM 14B, and that further associates the filter driver 32B to the flash storage device 16.

The computing device 65 includes a means 73 for sending the first stream ID to the first filter driver. The means 73 may comprise, for example, aspects of the process controller 30-1 (FIG. 1) that sends the stream ID to a filter driver 32. In one example, the process controller 30-1 may use an inter-program communication mechanism, such as an API or the like, to communicate the stream ID to the filter driver 32. In other examples, the process controller 30-1 may communicate the stream ID to the filter driver 32 as a parameter in a command used to associate the filter driver 32 with a respective computing process 14. Alternatively, the means 73 may include the use of an ioctl function as discussed above with regard to FIGS. 1 and 2. Similarly, in the context of FIG. 4, the means 73 may comprise, for example, aspects of the container controller 30-1A that function substantially similarly to the process controller 30-1 as discussed above to send a stream ID to a filter driver 32A. Similarly, in the context of FIG. 8, the means 73 may comprise, for example, aspects of the VM orchestrator 30-1B that function substantially similarly to the process controller 30-1 as discussed above to send a stream ID to a filter driver 32B.

Figure 10:
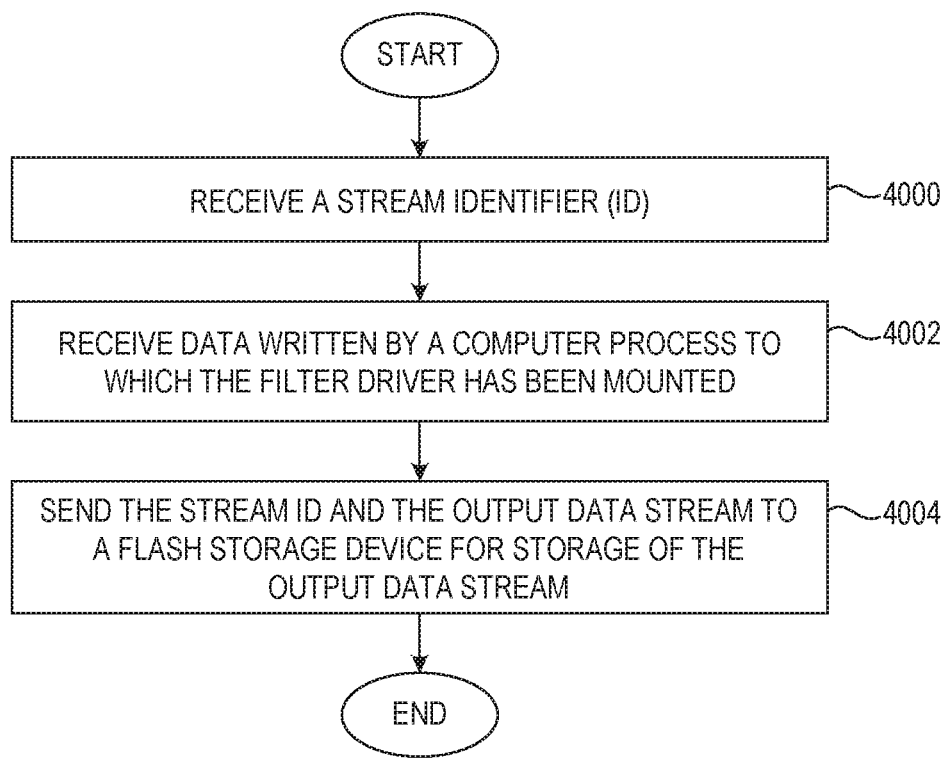
FIG. 10 is a flowchart of a method performed by a filter driver according to one example.

FIG. 10 is a flowchart of a method performed by a filter driver 32, 32A, 32B according to one example. The filter driver 32 receives a stream ID 28 (block 4000). The filter driver may receive the stream ID 28 from the process controller 30-1, the container controller 30-1A or the VM orchestrator 30-1B, depending on the particular implementation, via an inter-process communication mechanism, as a parameter in a command to associate the filter driver 32 with the respective computing process 14, container process 14A, or VM 14B, or via any other technique for communication information from one process to another process. The association, by mounting or other mechanism, of the filter driver 32 with a respective computing process 14, container process 14A, or computing process 63 results in output data streams from such processes to be sent to the filter driver 32.

The filter driver 32 receives data written by a computer process to which the filter driver 32 has been mounted (block 4002). The filter driver 32 sends the stream ID 28 and the output data stream to the flash storage device 16 for storage of the output data stream (block 4004).

Figure 11:
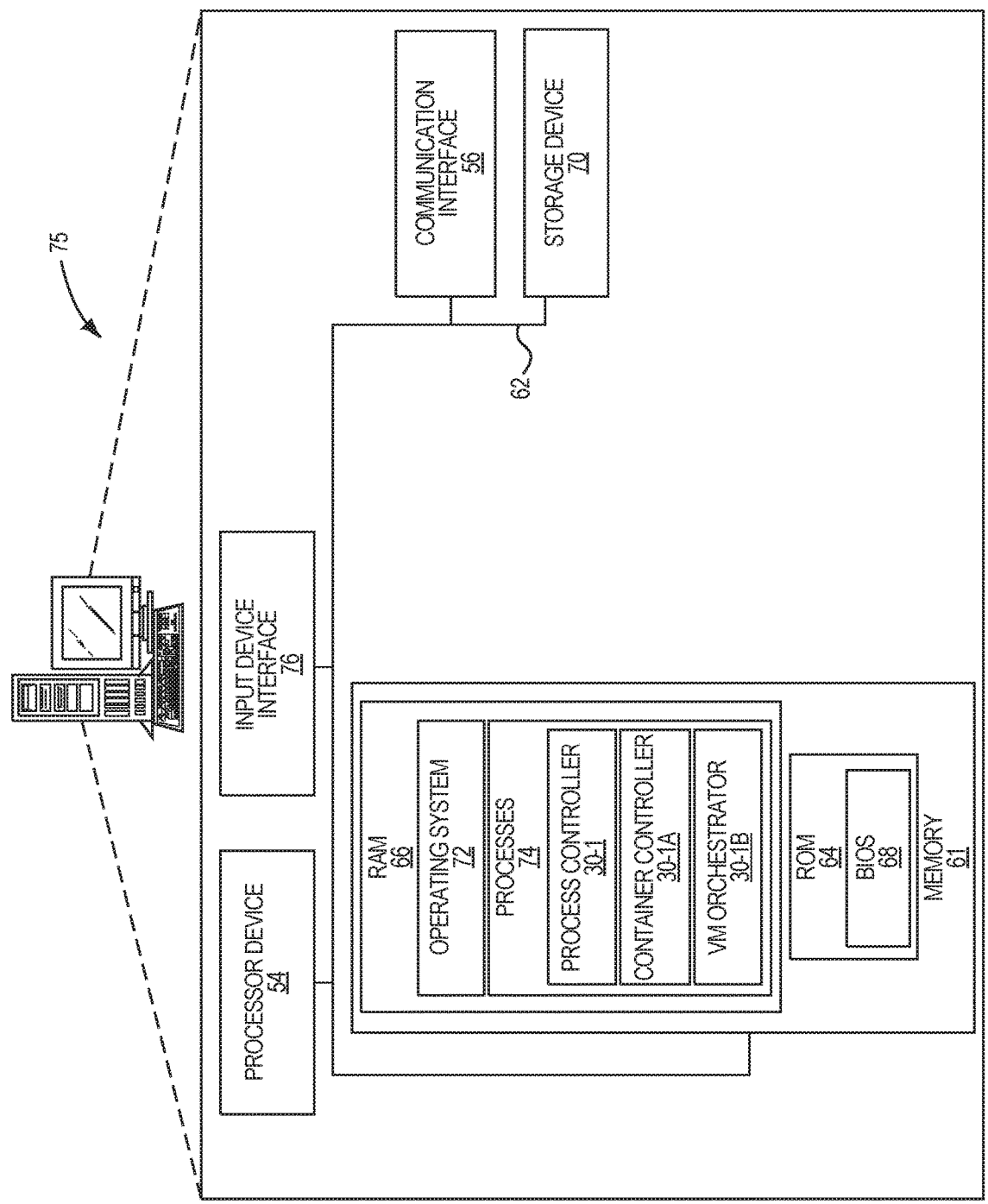
FIG. 11 is a block diagram of a computing device suitable for implementing examples according to one example.

FIG. 11 is a block diagram of a computing device 75 suitable for implementing any of the computing devices 12-1, 12-1A, or 12-1B. The computing device 75 may comprise any computing or electronic device capable of including firmware, hardware, and/or executing software instructions to implement the functionality described herein, such as a computer server, a desktop computing device, a laptop computing device, or the like. The computing device 75 includes the processor device 54, a system memory 61, and a system bus 62. The system bus 62 provides an interface for system components including, but not limited to, the system memory 61 and the processor device 54. The processor device 54 can be any commercially available or proprietary processor.

The system bus 62 may be any of several types of bus structures that may further interconnect to a memory bus (with or without a memory controller), a peripheral bus, and/or a local bus using any of a variety of commercially available bus architectures. The system memory 61 may include non-volatile memory 64 (e.g., read-only memory (ROM), erasable programmable read-only memory (EPROM), electrically erasable programmable read-only memory (EEPROM), etc.), and volatile memory 66 (e.g., random-access memory (RAM)). A basic input/output system (BIOS) 68 may be stored in the non-volatile memory 64 and can include the basic routines that help to transfer information between elements within the computing device 75. The volatile memory 66 may also include a high-speed RAM, such as static RAM, for caching data.

The computing device 75 may further include or be coupled to a non-transitory computer-readable storage medium such as a storage device 70, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 70 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of processes can be stored in the storage device 70 and in the volatile memory 66, including an operating system 72 and one or more processes 74, such as the process controller 30-1, container controller 30-1A, or the VM orchestrator 30-1B which may implement the functionality described herein in whole or in part.

All or a portion of the examples may be implemented as a computer program product stored on a transitory or non-transitory computer-usable or computer-readable storage medium, such as the storage device 70, which includes complex programming instructions, such as complex computer-readable program code, to cause the processor device 54 to carry out the steps described herein. Thus, the computer-readable program code can comprise software instructions for implementing the functionality of the examples described herein when executed on the processor device 54. The processor device 54, in conjunction with the process controller 30-1, container controller 30-1A, or the VM orchestrator 30-1B in the volatile memory 66, may serve as a controller, or control system, for the computing device 75 that is to implement the functionality described herein.

The operator 38 (FIG. 6) may also be able to enter one or more configuration commands through a keyboard (not illustrated) or a pointing device such as a mouse (not illustrated). Such input devices may be connected to the processor device 54 through an input device interface 76 that is coupled to the system bus 62 but can be connected by other interfaces such as a parallel port, an Institute of Electrical and Electronic Engineers (IEEE) 1394 serial port, a Universal Serial Bus (USB) port, an IR interface, and the like.

The computing device 75 may also include the communication interface 56 suitable for communicating with the network 58 as appropriate or desired.

The following are additional examples. Example 1 is a method for associating a stream identifier (ID) with an output data stream from a container process, that comprises determining, by a computing device comprising a processor device, a first container characteristic of a first container process that generates a first output data stream, accessing a structure that correlates the first container characteristic to a first stream ID, associating a first filter driver with the first container process to configure the first filter driver to receive the first output data stream, the first filter driver being associated with a flash storage device, and sending the first stream ID to the first filter driver.

Example 2 is a computing device for associating a stream ID with an output data stream from a container process, that comprises a communication interface to communicate with a network, and a processor device coupled to the communication interface to determine a first container characteristic of a first container process that generates a first output data stream, access a structure that correlates the first container characteristic to a first stream ID, associate a first filter driver with the first container process to configure the first filter driver to receive the first output data stream, the first filter driver being associated with a flash storage device, and send the first stream ID to the first filter driver.

Example 3 is an apparatus for associating a stream ID with an output data stream from a computing process, that comprises a means for determining a first computing process characteristic of a first computing process that generates a first output data stream, a means for accessing a structure that correlates the first computing process characteristic to a first stream ID, a means for associating a first filter driver with the first computing process to configure the first filter driver to receive the first output data stream, the first filter driver being associated with a flash storage device, and a means for sending the first stream ID to the first filter driver.

Example 4 is a method for categorizing an output data stream that comprises receiving, by a filter driver, a stream ID, receiving, by the filter driver, data written by a computer process to which the filter driver has been mounted, and sending the stream ID and the output data stream to a flash storage device for storage of the output data stream.

In example 5 the computer process of example 4 comprises a container process.

In example 6 the computer process of example 4 comprises a virtual machine.

Example 7 is a computing device that comprises a memory, a processor device coupled to the memory to receive a stream ID, receive data written by a computer process to which a filter driver has been mounted, and send the stream ID and an output data stream to a flash storage device for storage of the output data stream.

In example 8 the computer process of example 7 comprises a container process.

In example 9 the computer process of example 7 comprises a virtual machine.

Example 10 is a computing device for associating a stream ID with an output data stream. The computing device includes a communication interface to communicate with a network, and a processor device coupled to the communication interface. The processor device is to access first information that correlates a first computer process to a first stream ID. The processor device is further to associate a first filter driver with the first computer process to configure the first filter driver to receive a first output data stream from the first computer process, the first filter driver being associated with a flash storage device. The processor device is further to send the first stream ID to the first filter driver.

The examples have applicability in, among other environments, any type of cloud computing environment, such as, by way of non-limiting example, public, private, and/or hybrid cloud computing environments implemented, for example, by Red Hat® OpenStack, Oracle® Cloud, Amazon® Web Services, Google® Cloud, Microsoft® Azure, IBM® cloud services, Salesforce.com®, and the like.

Individuals will recognize improvements and modifications to the preferred examples of the disclosure. All such improvements and modifications are considered within the scope of the concepts disclosed herein and the claims that follow.

What is claimed is:

1. A method comprising:
    determining, by a computing device comprising a processor device, for each of a plurality of different computing processes associated with corresponding ones of a plurality of different tenants and executing on a same computing device, a corresponding stream identifier, each stream identifier being associated with a particular tenant;
    associating a filter driver with each different computing process; and
    associating each filter driver with a same flash storage device, each filter driver being configured to receive an output data stream from the computing process with which the filter driver is associated, and send the output data stream and the corresponding stream identifier to the same flash storage device.

2. The method of claim 1 wherein the plurality of different computing processes comprises container processes.

3. The method of claim 1 wherein the plurality of different computing processes comprises virtual machines.

4. The method of claim 1 wherein determining the corresponding stream identifier for each of the plurality of different computing processes comprises:
    for each respective computing process of the plurality of different computing processes:
        determining a computing process characteristic of the respective computing process; and
        accessing a structure that correlates the computing process characteristic to the corresponding stream identifier.

5. A computing device comprising:
    a communication interface to communicate with a network; and
    a processor device coupled to the communication interface to:
        determine, for each of a plurality of different computing processes associated with corresponding ones of a plurality of different tenants and executing on a same computing device, a corresponding stream identifier, each stream identifier being associated with a particular tenant;
        associate a filter driver with each different computing process; and
        associate each filter driver with a same flash storage device, each filter driver being configured to receive an output data stream from the computing process with which the filter driver is associated, and send the output data stream and the corresponding stream identifier to the same flash storage device.

6. The computing device of claim 5 wherein the plurality of different computing processes comprises container processes.

7. The computing device of claim 5 wherein the plurality of different computing processes comprises virtual machines.

8. The computing device of claim 5 wherein to determine the corresponding stream identifier for each of the plurality of different computing processes, the processor device is further to, for each respective computing process of the plurality of different computing processes:
    determine a computing process characteristic of the respective computing process; and
    access a structure that correlates the computing process characteristic to the corresponding stream identifier.

9. A computer program product stored on a non-transitory computer-readable storage medium and including instructions to cause a processor device to:
    determine, for each of a plurality of different computing processes associated with corresponding ones of a plurality of different tenants and executing on a same computing device, a corresponding stream identifier, each stream identifier being associated with a particular tenant;
    associate a filter driver with each different computing process; and
    associate each filter driver with a same flash storage device, each filter driver being configured to receive an output data stream from the computing process with which the filter driver is associated, and send the output data stream and the corresponding stream identifier to the same flash storage device.

10. The computer program product of claim 9 wherein the plurality of different computing processes comprises container processes.

11. The computer program product of claim 9 wherein the plurality of different computing processes comprises virtual machines.

12. The computer program product of claim 9 wherein to determine the corresponding stream identifier for each of the plurality of different processes the instructions further cause the processor device to, for each respective computing process of the plurality of different computing processes:
    determine a computing process characteristic of the respective computing process; and
    access a structure that correlates the computing process characteristic to the corresponding stream identifier.

* * * * *